US 9,189,190 B2

(12) United States Patent
Sugimoto

(10) Patent No.: US 9,189,190 B2
(45) Date of Patent: Nov. 17, 2015

(54) PRINT SYSTEM, PRINTING METHOD, AND NON-TRANSITORY COMPUTER-READABLE RECORDING MEDIUM STORED WITH PRINT PROGRAM

(71) Applicant: KONICA MINOLTA, INC., Chiyoda-ku (JP)

(72) Inventor: Kunihiko Sugimoto, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/623,123

(22) Filed: Feb. 16, 2015

(65) Prior Publication Data
US 2015/0248257 A1  Sep. 3, 2015

(30) Foreign Application Priority Data

Feb. 28, 2014  (JP) .................................. 2014-039491

(51) Int. Cl.
*G06F 3/12* (2006.01)
*H04N 1/60* (2006.01)
*G06K 15/02* (2006.01)

(52) U.S. Cl.
CPC ................ *G06F 3/124* (2013.01); *G06F 3/126* (2013.01); *G06F 3/1241* (2013.01); *G06F 3/1291* (2013.01); *G06K 15/027* (2013.01); *G06K 15/1878* (2013.01); *H04N 1/60* (2013.01)

(58) Field of Classification Search
None
See application file for complete search history.

(56) References Cited

U.S. PATENT DOCUMENTS

| | | | | |
|---|---|---|---|---|
| 4,797,706 A | * | 1/1989 | Sugishima et al. | ........... 358/300 |
| 6,738,151 B1 | * | 5/2004 | Kato | ............................. 358/1.12 |
| 6,856,416 B1 | * | 2/2005 | Danknick | ..................... 358/1.15 |
| 2002/0181022 A1 | * | 12/2002 | Tokashiki | ..................... 358/1.18 |
| 2004/0061890 A1 | * | 4/2004 | Ferlitsch | ..................... 358/1.15 |
| 2010/0118328 A1 | * | 5/2010 | Sakuraba | ..................... 358/1.14 |

OTHER PUBLICATIONS

"Print Alley System", Minolta Hanbai Co., Ltd., [retrieved on Jan. 20, 2014] from the Internet: <URL:http://ascii.jp/elem/000/000/308/308794/>.

* cited by examiner

Primary Examiner — Thomas D Lee
(74) Attorney, Agent, or Firm — Buchanan Ingersoll & Rooney PC

(57) ABSTRACT

A print system including a first printing apparatus subjected to color setting using a color sample, a second printing apparatus not subjected to color setting using a color sample, and a server computer generating a printing setting. The printing setting is used to cause the first printing apparatus to execute printing of a number of copies assigned to the first printing apparatus and proxy printing of a page that includes an object that requires strict color accuracy and is included in a number of copies assigned to the second printing apparatus, cause the second printing apparatus to execute printing of the number of copies assigned to the second printing apparatus except for the printing of the page, and merging the proxy printed page into the paper printed in the second printing apparatus.

18 Claims, 16 Drawing Sheets

FIG.18

| Printing job | |
|---|---|
| Print data | 4 pages |
| Printing setting | 900 copies |

↓ High quality page included
(page 4)

| Number-of-copies dividing printing job (second mode) | |
|---|---|
| Print data | 4 pages |
| Printing setting | Printing apparatus 100 subjected to color setting: Printing of 300 copies<br>Proxy printing of 150 copies of page 4 |
| | Printing apparatus 200: Printing of 300 copies of 3 pages except for page 4<br>Merging of page 4 |
| | Printing apparatus 300 (subjected to color setting): Printing of 300 copies<br>Proxy printing of 150 copies of page 4 |

PRINT SYSTEM, PRINTING METHOD, AND NON-TRANSITORY COMPUTER-READABLE RECORDING MEDIUM STORED WITH PRINT PROGRAM

CROSS-REFERENCE TO RELATED APPLICATION

This application is based on Japanese Patent Application No. 2014-039491 filed on Feb. 28, 2014, the contents of which are incorporated herein by reference.

BACKGROUND

1. Technical Field

The present invention relates to a print system, a printing method, and a non-transitory computer-readable recording medium stored with print program.

2. Description of Related Art

There is a print system that performs a number-of-copies dividing printing (a number-of-copies cluster printing) by assigning a printing job that involves a print output of a plurality of copies to a plurality of printing apparatuses. For example, Non-Patent Literature 1 ("Print Alley System", Minolta Hanbai Co., Ltd., [retrieved on 2014 Jan. 20] from the Internet: <URL: http://ascii.jp/elem/000/000/308/308794/>) describes a print system that allows efficient printing management by means of dividing a single printing job into a plurality of parts to assign them to a plurality of printing apparatuses so as to shorten an output time for a document with a large number of pages, or automatically discriminating between color pages and monochrome pages of a document consisting of both color and monochrome pages to separately output the pages to a color printing apparatus and a monochrome printing apparatus.

However, the print system causes a problem when print data included in the printing job includes an object that requires strict color accuracy. For example, color setting of a printing apparatus that ensures printing quality for an object requiring strict color accuracy is a time-consuming task using a color sample. Accordingly, such a color setting is suitably executed for only one or some of the printing apparatuses included in the print system. Due to this, regarding the object requiring strict color accuracy, color is different between a print output from a printing apparatus subjected to color setting using a color sample and a print output from a printing apparatus not subjected to color setting using a color sample, causing color variation, so that printing quality is degraded.

On the other hand, when the printing apparatus subjected to color setting using a color sample collectively prints pages that include the object requiring strict color accuracy, no color variation occurs in a print output of the object requiring strict color accuracy, so that printing quality can be ensured. It is, however, necessary to execute a task for merging the pages including the object requiring strict color accuracy to papers printed in the printing apparatus subjected to color setting using a color sample and a task for merging the pages to papers printed in the printing apparatus not subjected to color setting using a color sample. This reduces work efficiency.

SUMMARY

The present invention has been accomplished to solve the problem associated with the above prior art, and an object of the invention is to provide a print system, a printing method, and a non-transitory computer-readable recording medium stored with print program that achieve good work efficiency and are capable of ensuring the printing quality of objects requiring strict color accuracy.

To achieve at least one of the abovementioned objects, a print system reflecting one aspect of the present invention, includes: a first printing apparatus subjected to color setting using a color sample, and executing printing on a paper; a second printing apparatus not subjected to color setting using a color sample, and executing printing on a paper; and a control apparatus assigning a printing job that involves a print output of a plurality of copies to the first and the second printing apparatuses to cause the first and the second printing apparatuses to execute a number-of-copies dividing printing, the control apparatus, the first printing apparatus and the second printing apparatus being communicably connected to each other. Print data included in the printing job containing a page that includes an object needed to be printed by a printing apparatus subjected to color setting using a color sample. The control apparatus includes: a printing setting generation unit that generates a printing setting for causing the first printing apparatus to execute printing of a number of copies assigned to the first printing apparatus and proxy printing of the page included in a number of copies assigned to the second printing apparatus, causing the second printing apparatus to execute printing of the number of copies assigned to the second printing apparatus except for the printing of the page, and merging the proxy printed page into the paper printed in the second printing apparatus; and a communication unit that transmits a number-of-copies dividing printing job including the printing setting and the print data to the first and the second printing apparatuses. The first printing apparatus includes a printing unit that executes the printing of the assigned number of copies and the proxy printing of the page according to the received number-of-copies dividing printing job. The second printing apparatus includes a printing unit that executes the printing of the assigned number of copies except for the printing of the page, and a merging unit that merges the page proxy printed in the first printing apparatus into printed paper according to the received number-of-copies dividing printing job.

It is preferable in the above print system that the control apparatus includes a client computer and a server computer communicably connected to each other, the server computer including the printing setting generation unit and the communication unit, and the client computer including a communication unit that notifies the first printing apparatus and the second printing apparatus to the server computer.

It is preferable in the above print system having a plurality of the first printing apparatus that the control apparatus divides the proxy printing of the page to assign to each of the first printing apparatuses. It is further preferable that the proxy printing of the page is equally divided, or is divided on the basis of a printing speed or an operation status of each of the first printing apparatuses.

It is preferable in the above print system that the color setting of the second printing apparatus is performed by adjustment of calibration.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 18 is a conceptual diagram for illustrating a printing job of the second modification.

DETAILED DESCRIPTION

Hereinafter, embodiments of the present invention will be described with reference to the accompanying drawings. The dimensional ratio of each drawing is exaggerated for convenience of the description, and hence may differ from the actual ratio.

Figure 1:
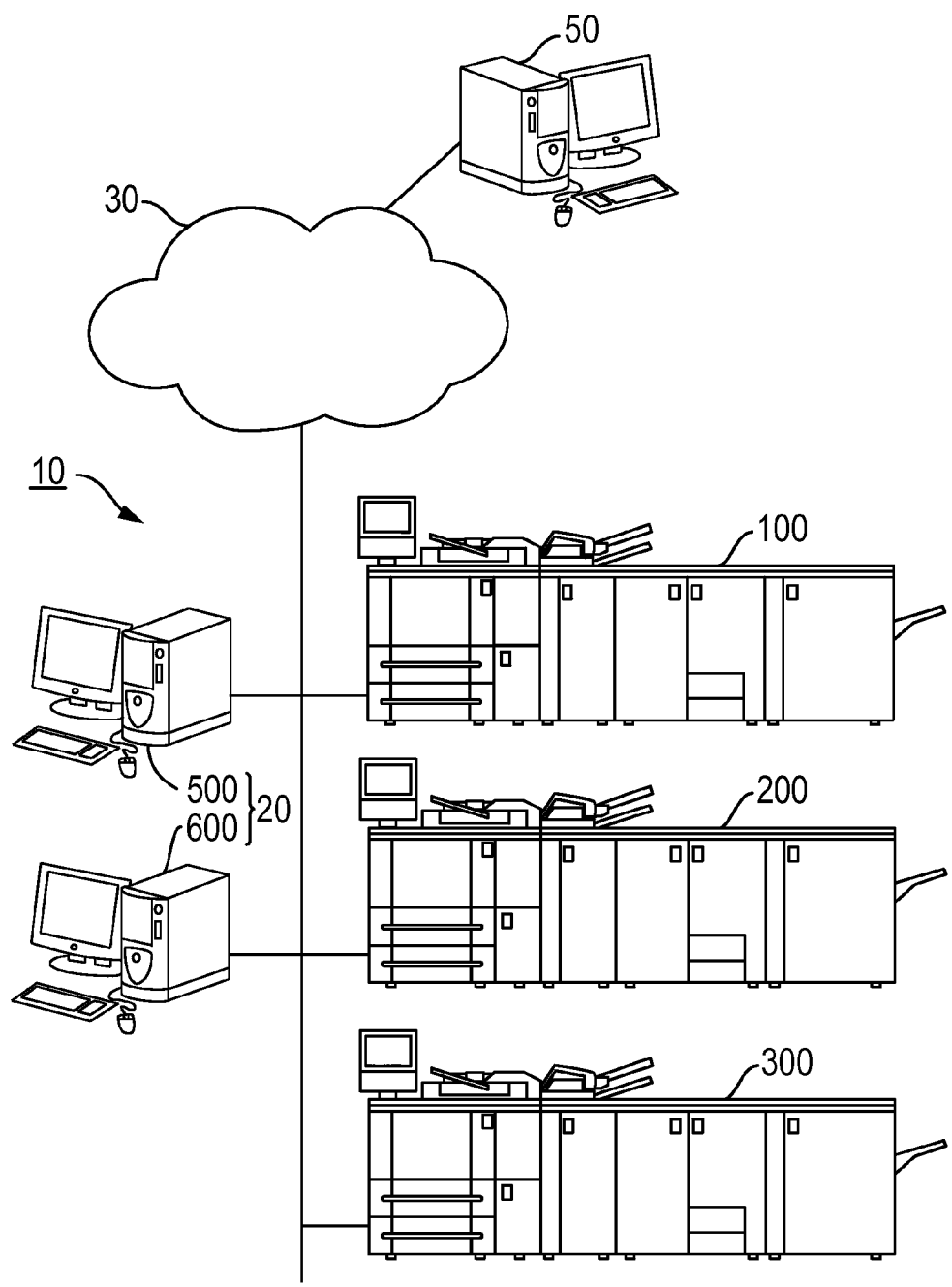
FIG. 1 is a schematic diagram for illustrating a print system according to an embodiment of the present invention.
Figure 2:
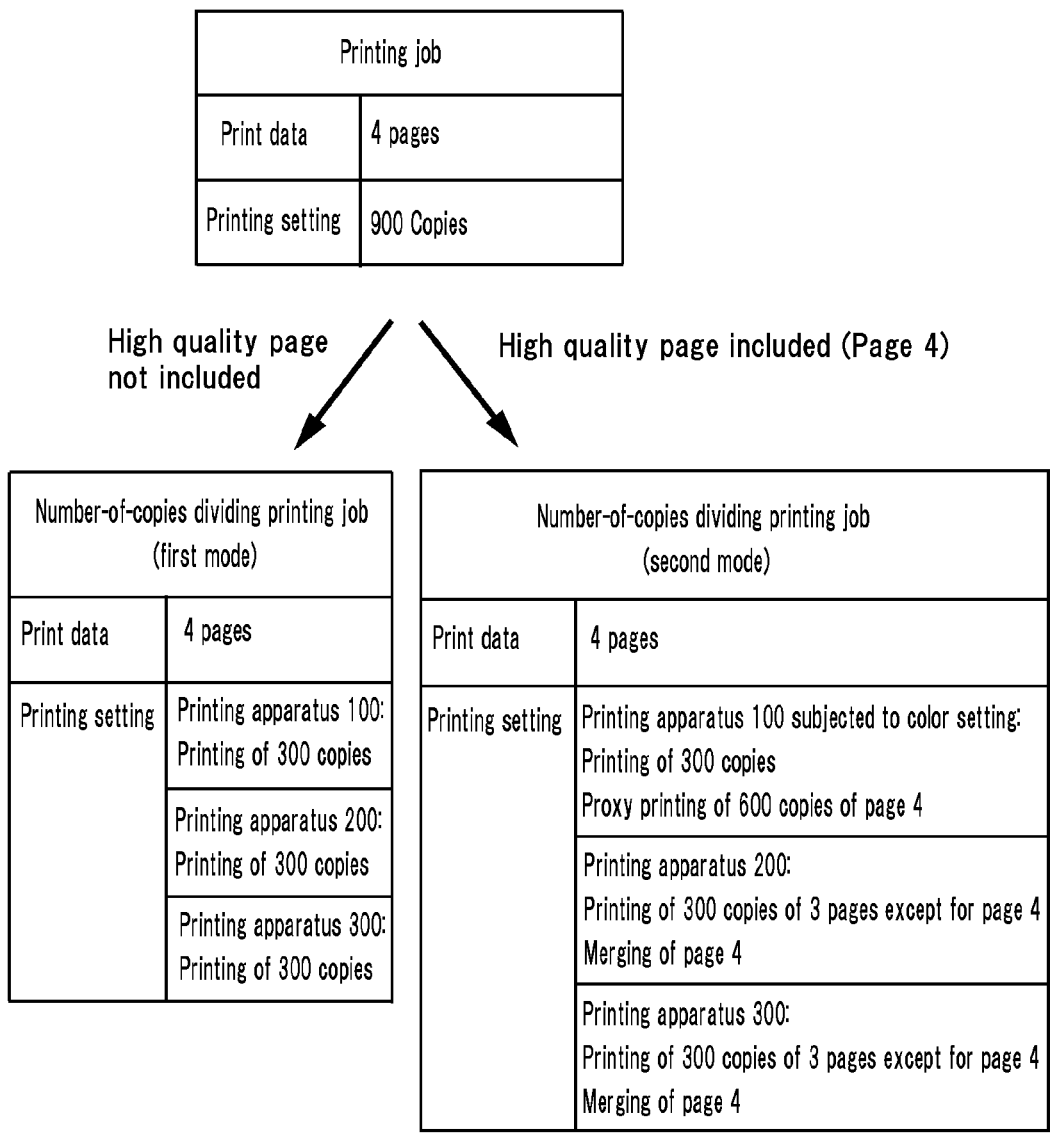
FIG. 2 is a conceptual diagram for illustrating a printing job of a number-of-copies dividing printing in the print system shown in FIG. 1.
Figure 3:
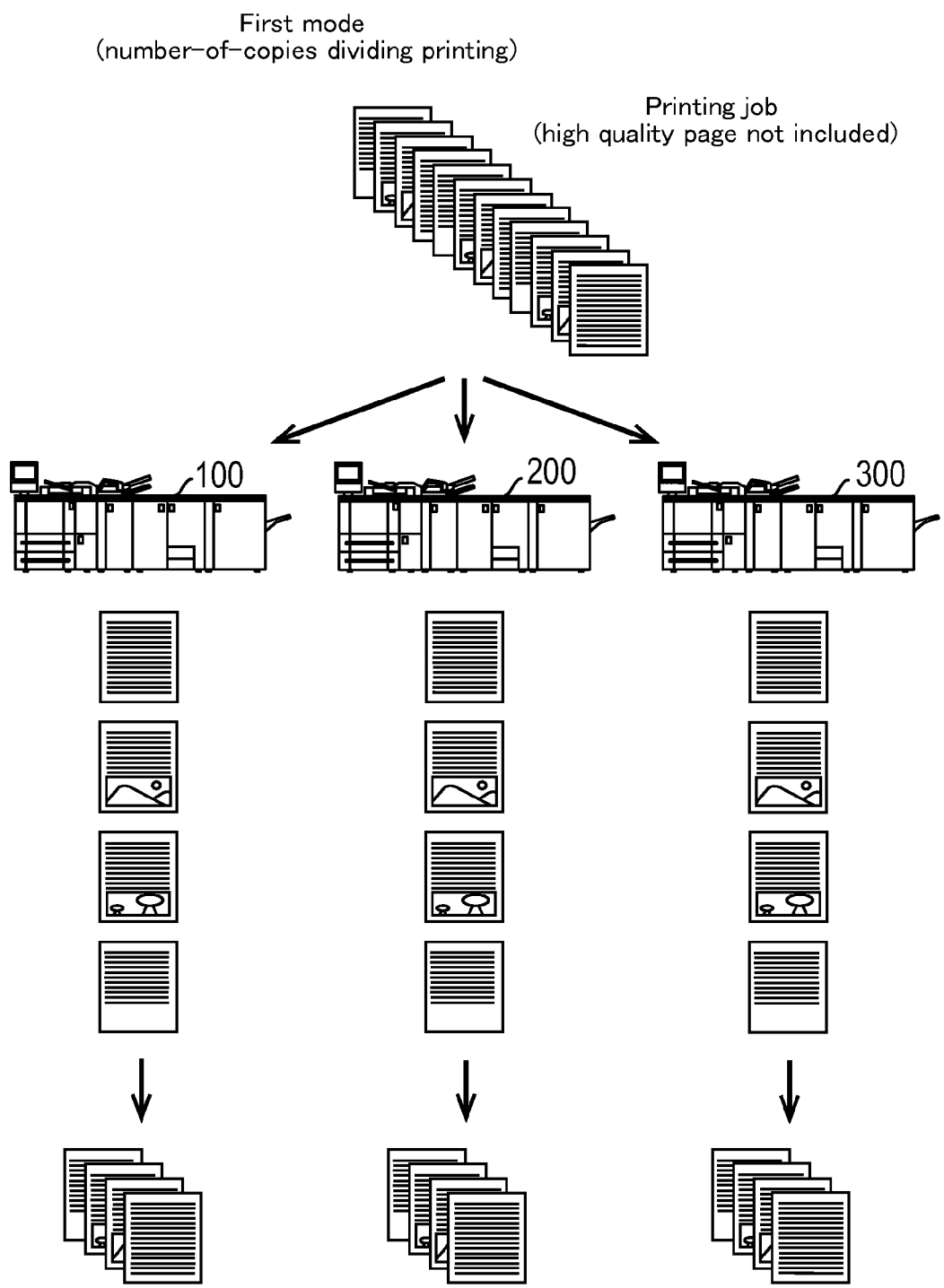
FIG. 3 is a schematic diagram for illustrating a first mode of the number of copies-dividing printing.
Figure 4:
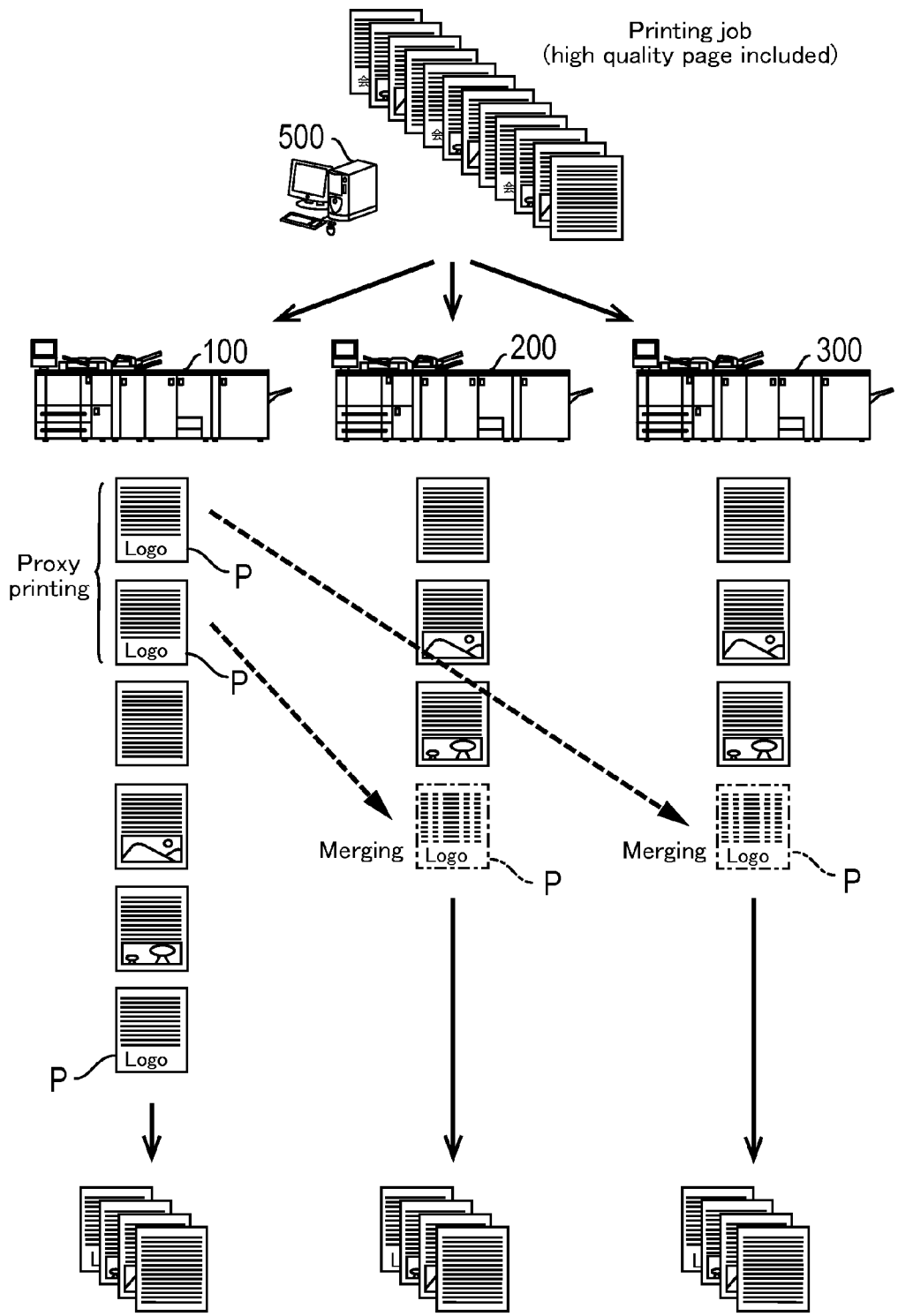
FIG. 4 is a schematic diagram for illustrating a second mode of the number of copies-dividing printing.

FIG. 1 is a schematic diagram for illustrating a print system according to an embodiment of the present invention; FIG. 2 is a conceptual diagram for illustrating a printing job of a number-of-copies dividing printing in the print system shown in FIG. 1; and FIGS. 3 and 4 are schematic diagrams for illustrating a first mode and a second mode of the number-of-copies dividing printing.

A print system 10 according to the embodiment of the invention is, for example, applied to Print On Demand (POD). As shown in FIG. 1, the print system 10 includes printing apparatuses 100, 200, and 300 and a control apparatus 20 that are communicably connected to each other via a network 30, and is used to perform a number-of-copies dividing printing by assigning a received printing job that involves a print output of a plurality of copies to the printing apparatuses 100, 200, and 300. The received printing job includes print data and printing setting (a job ticket), as shown in FIG. 2.

The printing apparatus 100 is a first printing apparatus subjected to color setting using a color sample. That is, in order to accurately reproduce a color space, color setting is made (a profile is created) using colorimetric data obtained from the color sample. On the other hand, the printing apparatuses 200 and 300 are second printing apparatuses subjected to color setting by adjustment of calibration (color setting has not been made using a color sample).

The color sample is, for example, JapanColor, Specifications for Web Offset Publications (SWOP), Euro Standard, or Fogra Graphic Technology Research Association (FOGRA). Examples of a color sample for specified colors include PANTONE (registered trademark), TOYO INK Color Chart (color chart), and DIC Color Guide (registered trademark).

The control apparatus 20 is used to manage printing in the printing apparatuses 100, 200, and 300. The control apparatus 20 in the present embodiment includes a server computer 500 and a client computer 600. The reference sign 50 denotes a client computer of a client who requests a printing job via the network 30.

The number-of-copies dividing printing includes a first mode and a second mode. The first mode is applied when the print data does not contain any page that includes an object requiring strict color accuracy needed to be printed by a printing apparatus subjected to color setting using a color sample. The second mode is applied when the print data contains a page that includes an object requiring strict color accuracy. Hereinafter, a page that contains an object requiring strict color accuracy needed to be printed by a printing apparatus subjected to color setting using a color sample will be referred to as high quality page. The object that requires strict color accuracy is, for example, a company logo.

In the first mode, the printing apparatuses 100, 200, and 300, respectively, perform printing of an assigned number of copies, as shown in FIG. 3. For example, as shown in FIG. 2, upon reception of a printing job for printing 900 copies of a printed matter consisting of 4 pages that do not contain the high quality page P, the number of copies to be assigned to the printing apparatuses 100, 200, and 300 in a printing job (a number-of-copies dividing printing job) transmitted to the printing apparatuses 100, 200, and 300 is 300 for each printing apparatus.

In the second mode, as shown in FIG. 4, the printing apparatus 100 prints the assigned number of copies and high quality pages P included in the number of copies assigned to the printing apparatuses 200 and 300. On the other hand, the printing apparatuses 200 and 300 execute printing of the assigned number of copies except for printing of the high quality page P, and merge the high quality page P proxy printed in the printing apparatus 100 into paper printed in the printing apparatuses 200 and 300.

For example, as shown in FIG. 2, upon reception of a printing job for printing 900 copies of a printed matter consisting of 4 pages in which page 4 is the high quality page P, the printing apparatus 100 prints 300 copies assigned thereto and also proxy prints 600 copies of the high quality page P for the printing apparatuses 200 and 300 in a printing job (a number-of-copies dividing printing job) transmitted to the printing apparatuses 100, 200, and 300. Additionally, each of the printing apparatuses 200 and 300 is set to print 300 copies of a printed matter consisting of 3 pages except for the page 4 and place (merge) the high quality page P proxy printed in the printing apparatus 100 in a position after page 3 of each printed matter.

In the second mode, as described above, the printing apparatus 100 subjected to color setting using a color sample executes printing of the assigned number of copies as they are without excluding the high quality page P. Thus, it is unnecessary to perform a task for merging the high quality page P into paper printed in the printing apparatus 100, so that work efficiency reduction is suppressed. Additionally, the high quality page P included in the number of copies assigned to the printing apparatuses 200 and 300 not subjected to color setting using a color sample is proxy printed in the printing apparatus 100 subjected to color setting using a color sample, and then merged into paper printed in the printing apparatuses 200 and 300. Thus, color variation does not occur in the print output of the object requiring strict color accuracy, so that printing quality is ensured. In other words, the print system of the embodiment has good work efficiency and can ensure printing quality of objects requiring strict color accuracy.

Printing setting for a printing job (a number-of-copies dividing printing job) transmitted to the printing apparatuses 100, 200, and 300 is created, for example, using a printing setting included in a printing job from the client computer 50 of a client and adding the high quality page proxy printed in the printing apparatus 100 (the high quality page excluded from printing in the printing apparatuses 200 and 300) thereto, and the like.

Examples of the network 30 include various networks such as a local area network (LAN) connecting computers and network devices to each other through a standard such as Ethernet (registered trademark), Token Ring, and Fiber-Distributed Data Interface (FDDI), a Wide Area Network (WAN) connecting LANS with each other through an exclusive line, the Internet, and a combination of any thereof. Network protocol is, for example, Transmission Control Protocol/Internet Protocol (TCP/IP). The kinds and numbers of devices connected to the network 30 are not limited to those in the structure shown in FIG. 1.

The printing apparatuses 100, 200, and 300 can also be directly connected to the server computer 500 (the control apparatus 20). In this case, for example, a serial interface such as a universal serial bus (USB) or a parallel interface such as IEEE (the institute of electrical and electronics engineers) 1284 is applied. When necessary, it is also possible to apply a wireless communication using Bluetooth (registered trademark) at radio waves of 2.4 GHz band or the like, or communication in an ad hoc mode of wireless LAN.

Figure 5:
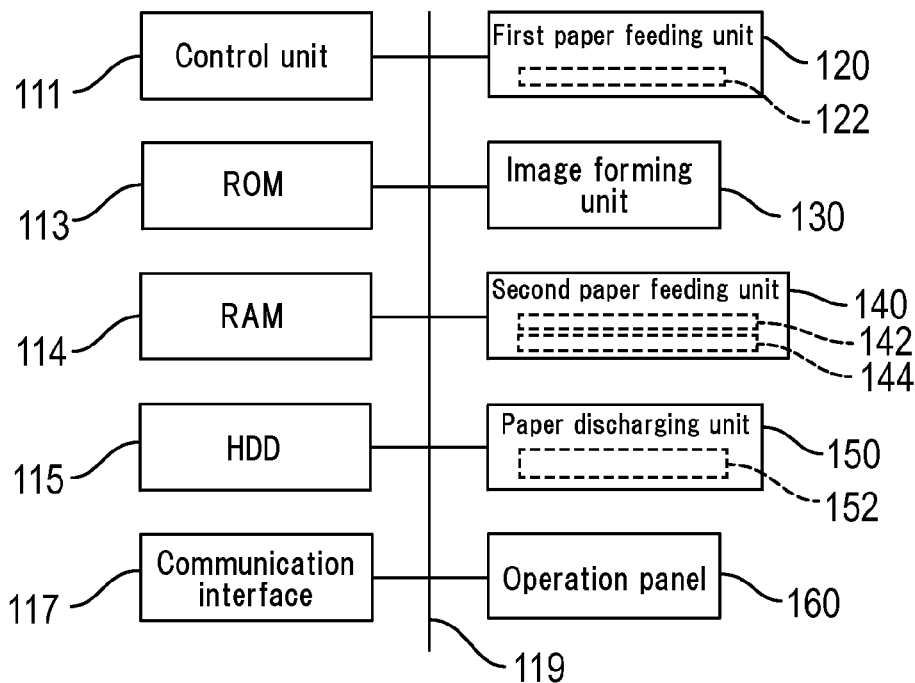
FIG. 5 is a block diagram for illustrating a printing apparatus 100 shown in FIG. 1.

Next, the printing apparatus 100 will be described in detail. FIG. 5 is a block diagram for illustrating the printing apparatus 100 shown in FIG. 1.

The printing apparatus 100 includes a control unit 111, a ROM 113, a RAM 114, an HDD 115, a communication interface 117, a first paper feeding unit 120, an image forming unit 130, a second paper feeding unit 140, a paper discharging unit 150, and an operation panel unit 160, as shown in FIG. 5. These elements are connected to one another via a bus 119.

The control unit 111 is a control circuit formed using a microprocessor that executes controls of the above respective units and various kinds of arithmetic processing according to programs. Each function of the printing apparatus 100 is exerted by causing the control unit 111 to execute a program corresponding to the each function. The ROM 113 is a read-only storage device storing various kinds of programs and data. The RAM 114 is a high speed random access storage device temporarily storing a program and data, as a work area.

The HDD 115 is a large-capacity magnetic disk device storing various kinds of data and processing programs. Each of the stored programs is read, as needed, by the control unit 111, then executed and processed on the RAM 114. The stored data is printing setting and print data (image data) included in a printing job (a number-of-copies dividing printing job) transmitted from the server computer 500.

The printing setting associated with the printing apparatus 100 includes a first mode printing setting and a second mode printing setting. The first mode printing setting is a setting for causing the image forming unit 130 to execute printing of the number of copies assigned to the printing apparatus 100 when the print data does not contain any high quality page and the number-of-copies dividing printing is in the first mode. The second mode printing setting is a setting for causing the image forming unit 130 to execute proxy printing of a high quality page contained in the number of copies assigned to the printing apparatuses 200 and 300, in addition to the printing of the number of copies assigned to the printing apparatus 100 when the print data contains the high quality page and the number-of-copies dividing printing is in the second mode (see FIG. 2).

The stored processing programs include a program for RIP processing (Raster Image Processing) and the like. The RIP processing is a processing for converting print data included in a printing job into Raster Image data used in the image forming unit 130.

When needed, it is also possible to store a part of the programs and data stored in the HDD 115 in the ROM 113 or store a part of the programs and data stored in the ROM 113 in the HDD 115. In addition, instead of the HDD 115, a large-capacity semiconductor memory can be applied, or as needed, the HDD 115 can be omitted.

The communication interface 117 is a communication unit composed of a so-called LAN board and is an extension device that adds a communication function for connecting the server computer 500 via the network 30 and executing transmission and reception of data, to the printing apparatus 100.

The first paper feeding unit 120 includes a plurality of paper feeding trays 122 that hold various kinds of paper, and is used to take out the paper from the paper feeding tray specified by the control unit 111 to convey the paper to the image forming unit 130.

The image forming unit 130 includes an engine that forms an image on paper as a record medium by using an image forming process, such as an electrophotographic process including steps of electrostatic charging, exposure, development, transfer, and fixing, and is a printing unit used to print the print data stored in the HDD 115 by instruction of the control unit 111. Printing (image formation) is not limited to the form of using the electrophotographic process, and an impact method, a thermal transfer method, or an inkjet method is applicable as needed.

The second paper feeding unit 140 includes a PI tray (paper insertion tray) 142 and a merging unit 144. The PI tray 142 is used to hold paper to be fed to the merging unit 144. The merging unit 144 is used to merge the paper fed from the PI tray 142 into paper printed in the image forming unit 130. The paper held on the PI tray 142 is placed, for example, by an operator of the client computer 600.

The paper discharging unit 150 includes a paper discharge tray 152 and is used to discharge paper directly conveyed from the image forming unit 130 and paper conveyed from the image forming unit 130 via the merging unit 144.

The operation panel unit 160 includes a touch panel and a keyboard. The touch panel serves both as an input unit used to allow an operator to issue (input) various kinds of instructions and an output unit used to present, to the operator, an apparatus configuration, a state of progress of a printing job, a state of occurrence of errors, a currently changeable setting, and the like.

Next, the printing apparatuses 200 and 300 will be described in detail.

Figure 6:
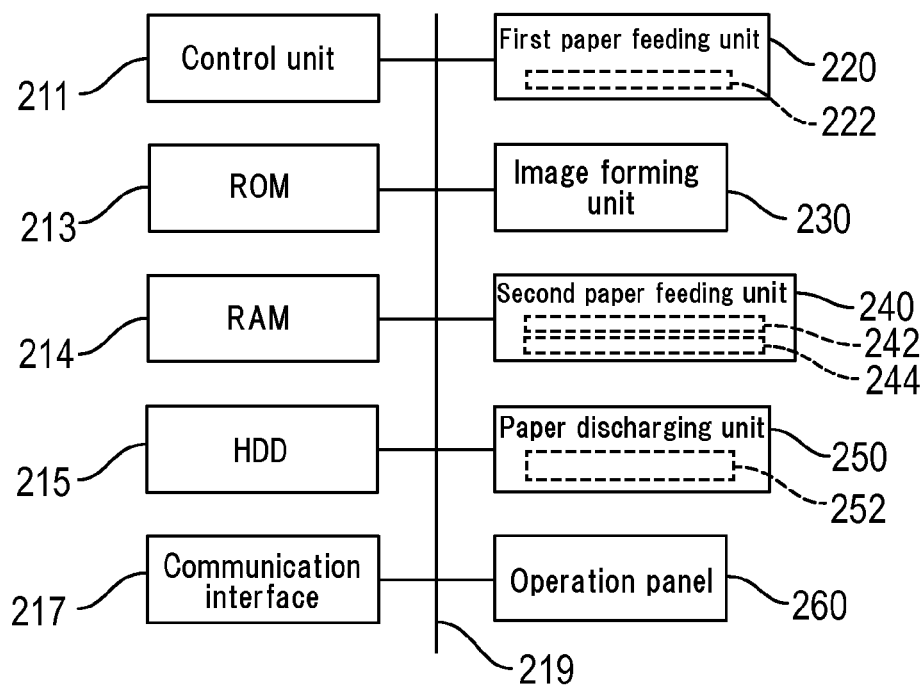
FIG. 6 is a block diagram for illustrating a printing apparatus 200 shown in FIG. 1.
Figure 7:
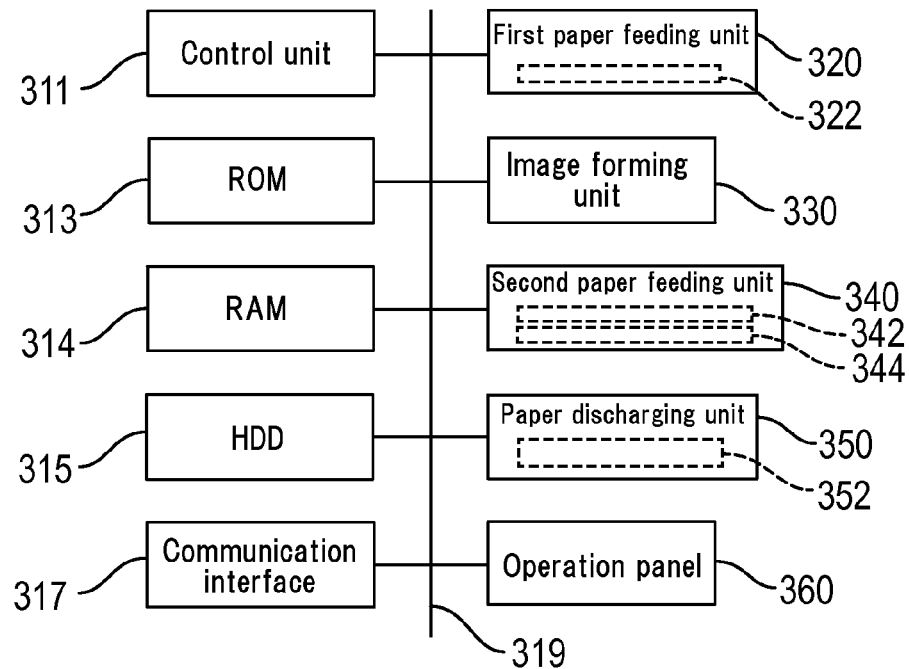
FIG. 7 is a block diagram for illustrating a printing apparatus 300 shown in FIG. 1.

FIGS. 6 and 7 are block diagrams for illustrating the printing apparatuses 200 and 300 shown in FIG. 1.

The printing apparatuses 200 and 300 are substantially the same as the printing apparatus 100, except that color setting has been made by adjustment of calibration. Thus, the similar reference signs are given to members having the similar functions as those in the printing apparatus 100 and a description thereof will be omitted as needed in order to avoid redundancy.

The printing apparatus 200 includes a control unit 211, a ROM 213, a RAM 214, an HDD 215, a communication interface 217, a first paper feeding unit 220 with a paper feeding tray 222, an image forming unit 230, a second paper feeding unit 240 with a PI tray 242 and a merging unit 244, a paper discharging unit 250 with an paper discharge tray 252, and an operation panel unit 260, as shown in FIG. 6. These elements are connected to one another via a bus 219.

The printing apparatus 300 includes a control unit 311, a ROM 313, a RAM 314, an HDD 315, a communication interface 317, a first paper feeding unit 320 with a paper feeding tray 322, an image forming unit 330, a second paper feeding unit 340 with a PI tray 342 and a merging unit 344, a paper discharging unit 350 with an paper discharge tray 352, and an operation panel unit 360, as shown in FIG. 7. These elements are connected to one another via a bus 319.

The HDD 215 (315) stores printing setting and print data (image data) included in a printing job (a number-of-copies dividing printing job) transmitted from the server computer 500. The printing setting associated with the printing apparatus 200 (300) includes a first mode printing setting and a second mode printing setting. The first mode printing setting is a setting for causing the image forming unit 230 (330) to execute printing of the number of copies assigned to the printing apparatus 200 (300) when the print data does not contain any high quality page and the number-of-copies dividing printing is in the first mode. The second mode printing setting is a setting for causing the image forming unit 230 (330) to execute, when the print data contains a high quality page and the number-of-copies dividing printing is in the second mode, printing of the assigned number of copies except for the printing of the high quality page and also feeding of the high quality page proxy printed in the printing apparatus 100 from the PI tray 242 (342) to merge the high quality page into printed paper in the merging unit 244 (344) (see FIG. 2).

Next, the server computer will be described in detail.

Figure 8:
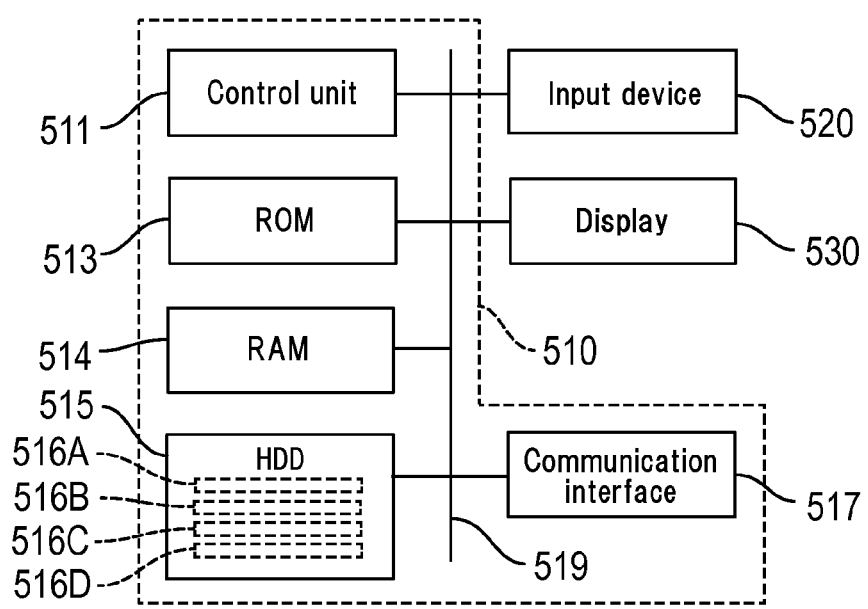
FIG. 8 is a block diagram for illustrating a sever computer shown in FIG. 1.

FIG. 8 is a block diagram for illustrating the server computer 500 shown in FIG. 1.

The server computer 500 includes a main body unit 510, an input device 520, and a display 530, as shown in FIG. 8. The main body unit 510 includes a control unit 511, a ROM 513, a RAM 514, an HDD 515, and a communication interface 517. These elements are connected to one another via a bus 519.

The control unit 511 is a control circuit formed using a microprocessor that executes controls of the above respective units and various kinds of arithmetic processing according to programs and the like. Each function of the server computer 500 is exerted by causing the control unit 511 to execute a program corresponding to the each function. The ROM 513 is a nonvolatile semiconductor memory storing various kinds of programs and data. The RAM 514 is a volatile semiconductor memory temporarily storing a program and data, as a work area.

The HDD 515 is a large-capacity magnetic disk device that stores various kinds of data and various kinds of processing programs. The stored programs are read, as needed, by the control unit 511, then executed and processed on the RAM 514. The stored data are a printing setting and print data (image data) included in a printing job transmitted from the client computer 50 of a client, status data of the printing apparatuses used for the number-of-copies dividing printing, and a number-of-copies dividing printing instruction. The status data of the printing apparatuses is, for example, a list of available printing apparatuses and the presence or absence of color setting using a color sample, printing speed, and operation status. The number-of-copies dividing printing instruction includes a value of the number of copies assigned to each of the printing apparatuses 100, 200, and 300 and a mode of the number-of-copies dividing printing.

Examples of the stored processing programs include a printing apparatus registration program 516A, a notification program 516B, an instruction reception program 516C, and a printing setting generation program (a printing setting generating unit) 516D. The printing apparatus registration program 516A has a function of receiving status data of the printing apparatuses from the client computer 600 to store the data in the HDD 515. The notification program 516B has a function of receiving a printing job from the client computer 50 of a client and transmitting the content of the printing job (for example, printing setting and print data) to the client computer 600. The instruction reception program 516C has a function of receiving a number-of-copies dividing printing instruction from the client computer 600 to store it in the HDD 515.

The printing setting generation program 516D has a function of creating a first mode printing setting and a second mode printing setting associated with the printing apparatuses 100, 200, and 300 on the basis of the number-of-copies dividing printing instruction.

The printing apparatus registration program 516A, the notification program 516B, the instruction reception program 516C, and the printing setting generation program 516D are not limited to forms of single application software. These programs can be created as a single program achieving all the functions thereof or can be incorporated as a single function into another software.

When necessary, it is also possible to store a part of the programs and data stored in the ROM 513 in the HDD 515, or store a part of the programs and data stored in the HDD 515 in the ROM 513.

The communication interface 517 is a communication unit composed of an extension device (a LAN board) for adding a communication function via the network 30 to the server computer 500 and is used to execute transmission and reception of data to the client computer 50 of a client, the printing apparatuses 100, 200, 300, and the client computer 600 of an operator via the network 30.

The input device 320 includes a keyboard and a pointing device such as a mouse and is used, for example, to allow an operator to perform (input) various kinds of settings and various kinds of instructions. The display 330 is, for example, a cathode ray tube (CRT) display or a liquid crystal display (LCD), and is used to display various kinds of information on a graphical user interface (GUI) screen.

Next, the client computer 600 will be described in detail.

Figure 9:
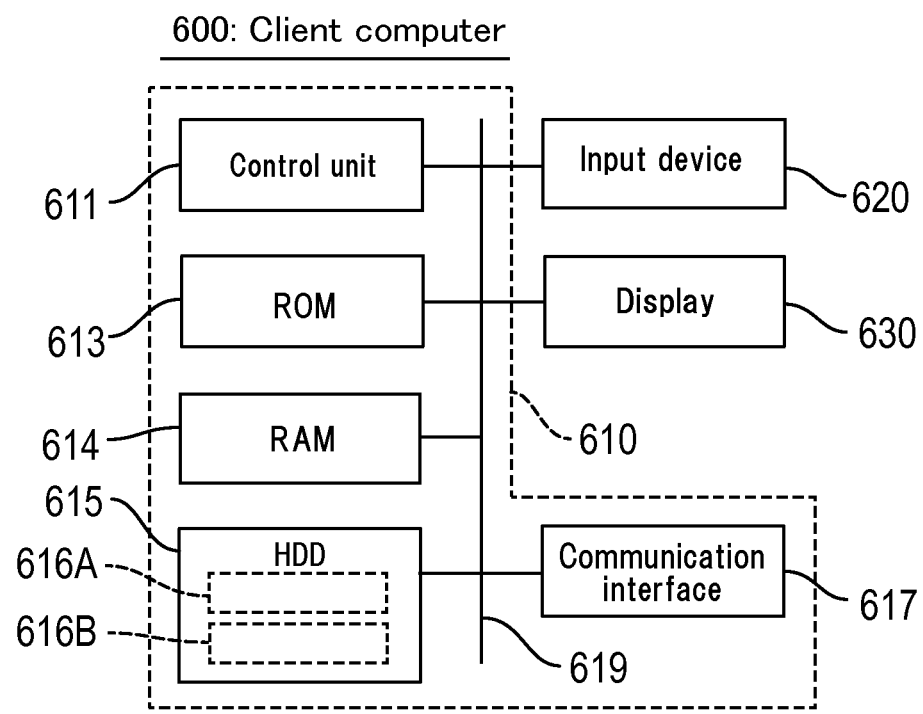
FIG. 9 is a block diagram for illustrating a client computer shown in FIG. 1.

FIG. 9 is a block diagram for illustrating the client computer 600 shown in FIG. 1.

The client computer 600 is substantially the same as the server computer 500, except that the stored data and processing programs are different. Thus, the similar reference signs are given to members having the similar functions as those of the server computer 500 and a description thereof will be omitted as needed for avoiding redundancy.

The client computer 600 includes a main body unit 610, an input device 620, and a display 630, as shown in FIG. 9. The main body unit 610 includes a control unit 611, a ROM 613, a RAM 614, an HDD 615, and a communication interface 617. These elements are connected to one another via a bus 619.

Examples of data stored in the HDD 615 include printing apparatus status data input by an operator and the content of a printing job (for example, printing setting and print data) notified from the server computer 500.

Examples of processing programs stored in the HDD 615 include a status data notification program 616A and an instruction creation program 616B. The status data notification program 616A has a function of notifying (transmitting) the printing apparatus status data input by the operator to the server computer 500. The instruction creation program 616B has a function of creating a number-of-copies dividing printing instruction on the basis of the content of the printing job (for example, the printing setting and print data) notified from the server computer 500 and an instruction of the operator, and transmitting it to the server computer 500.

The status data notification program 616A and the instruction creation program 616B are not limited to forms of single application software. These programs can be created as a single program achieving all the functions thereof or can be incorporated as a single function into another software.

Next, the printing method according to the embodiment of the invention will be described.

Figure 10:
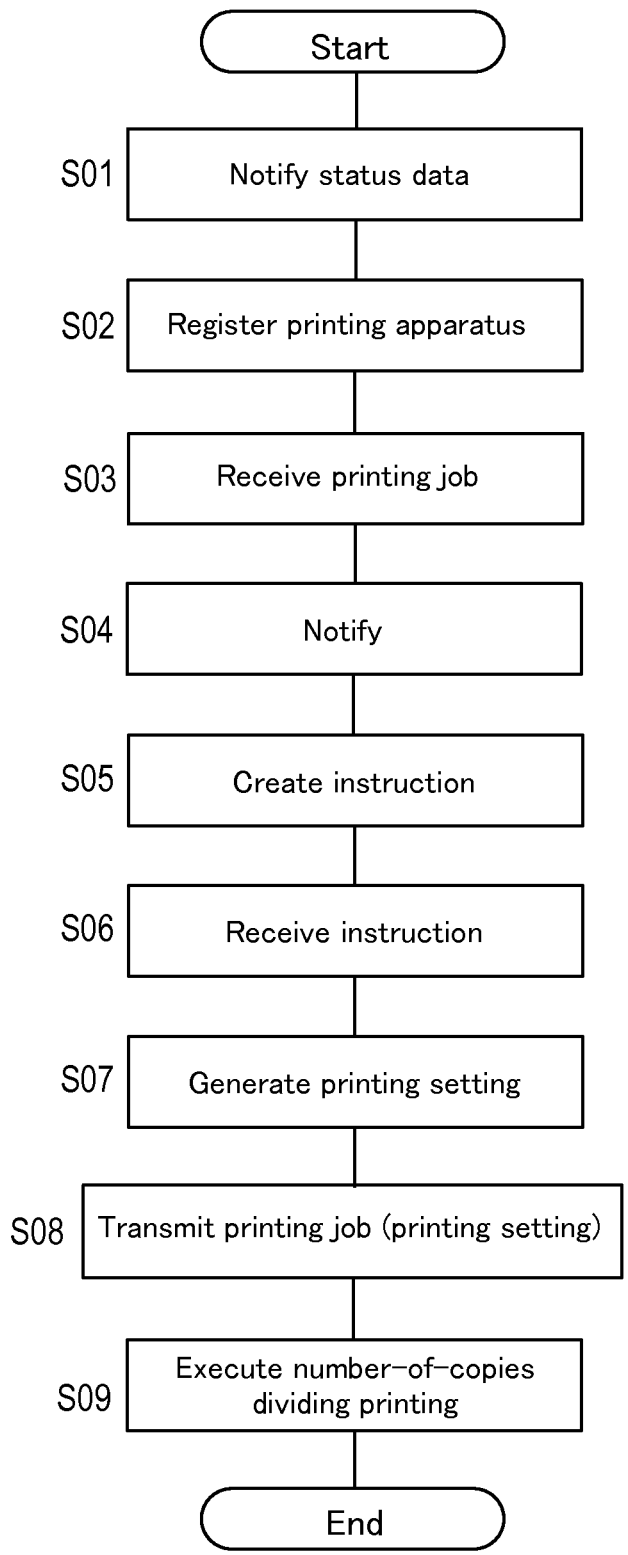
FIG. 10 is a flowchart for illustrating a printing method according to the embodiment of the present invention.

FIG. 10 is a flowchart for illustrating the printing method according to the embodiment of the invention.

The printing method according to the embodiment of the invention is used to assign a received printing job involving a print output of a plurality of copies to the printing apparatuses 100, 200, 300 and to cause the printing apparatuses 100, 200, 300 to execute a number-of-copies dividing printing. The printing method includes a status data notification step S01, a printing apparatus registration step S02, a printing job reception step S03, a notification step S04, an instruction creation step S05, an instruction reception step S06, a printing setting generation step S07, a printing setting transmission step S08, and a number-of-copies dividing printing step S09.

In the status data notification step S01, the client computer 600 notifies (transmits) the status data of the printing apparatuses 100, 200, and 300 input by an operator to the server computer 500.

In the printing apparatus registration step S02, the server computer 500 receives the status data of the printing apparatuses from the client computer 600 through the communication interface 517 and registers (stores) the status data in the HDD 515.

In the printing job reception step S03, the server computer 500 receives a printing job from the client computer 50 of a client through the communication interface 517 and stores the printing job in the HDD 515.

In the notification step S04, the server computer 500 notifies (transmits) the reception of the printing job from the client computer 50 of the client and the content of the printing job (for example, printing setting and print data) to the client computer 600.

In the instruction creation step S05, the client computer 600 creates a number-of-copies dividing printing instruction on the basis of the content of the printing job (for example, the printing setting and print data) notified from the server computer 500 and an instruction of the operator and transmits it to the server computer 500.

In the instruction reception step S06, the server computer 500 receives the number-of-copies dividing printing instruction from the client computer 600 through the communication interface 517 and stores it in the HDD 515.

In the printing setting generation step S07, the server computer 500 creates a first mode printing setting or a second mode printing setting on the basis of the number-of-copies dividing printing instruction.

In the printing setting transmission step S08, the server computer 500 transmits the printing job (the print data and the created first mode printing setting or second mode printing setting) to the printing apparatuses 100, 200, and 300 through the communication interface 517.

In the number-of-copies dividing printing step S09, the printing apparatuses 100, 200, and 300 perform a number-of-copies dividing printing according to the printing setting (the first or second mode printing setting) included in the received printing job by using the print data included in the printing job.

The operations in the status data notification step S01 and the instruction creation step S05 are stored as the status data notification program 616A and the instruction creation program 616B in the HDD 615 of the client computer 600 and executed by the control unit 611. The operations in the printing apparatus registration step S02, the printing job reception step S03, the notification step S04, the instruction reception step S06, the printing setting generation step S07, and the printing setting transmission step S08 are stored as the printing apparatus registration program 516A, the notification program 516B, the instruction reception program 516C, and the printing setting generation program 516D in the HDD 515 of the server computer 500 and executed by the control unit 511.

Next, an operation of the printing apparatus 100 in the number-of-copies dividing printing step S09 will be described.

Figure 11:
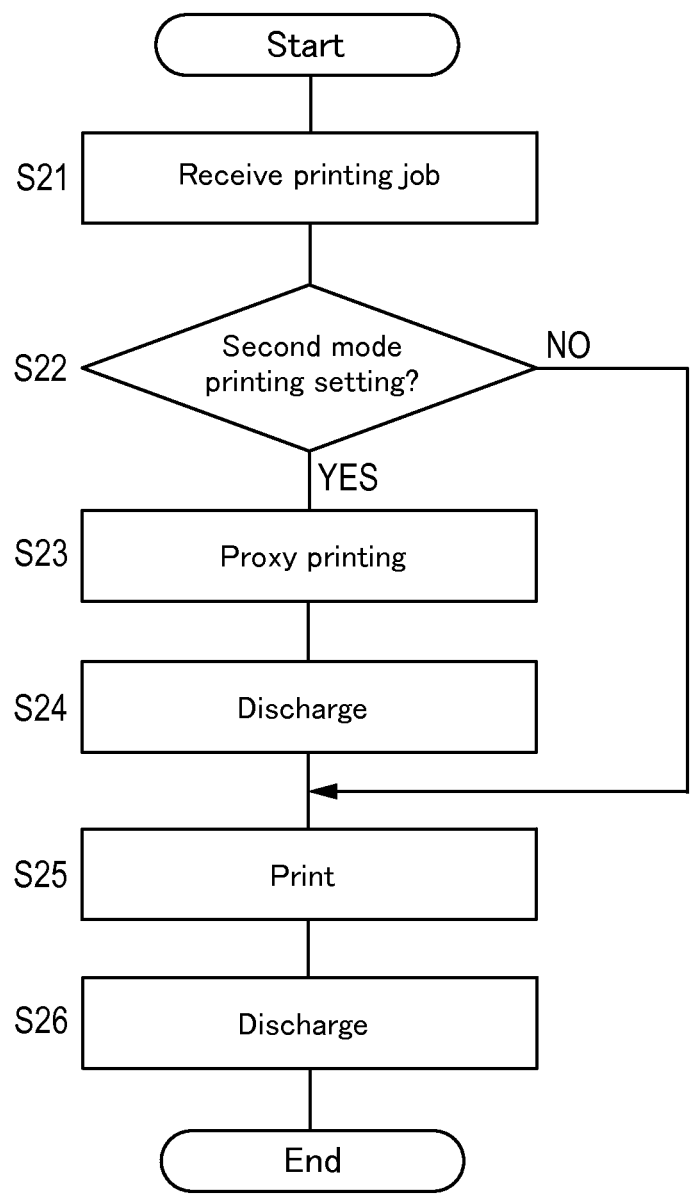
FIG. 11 is a flowchart for illustrating an operation of the printing apparatus 100 in a number-of-copies dividing printing step shown in FIG. 10.
Figure 12:
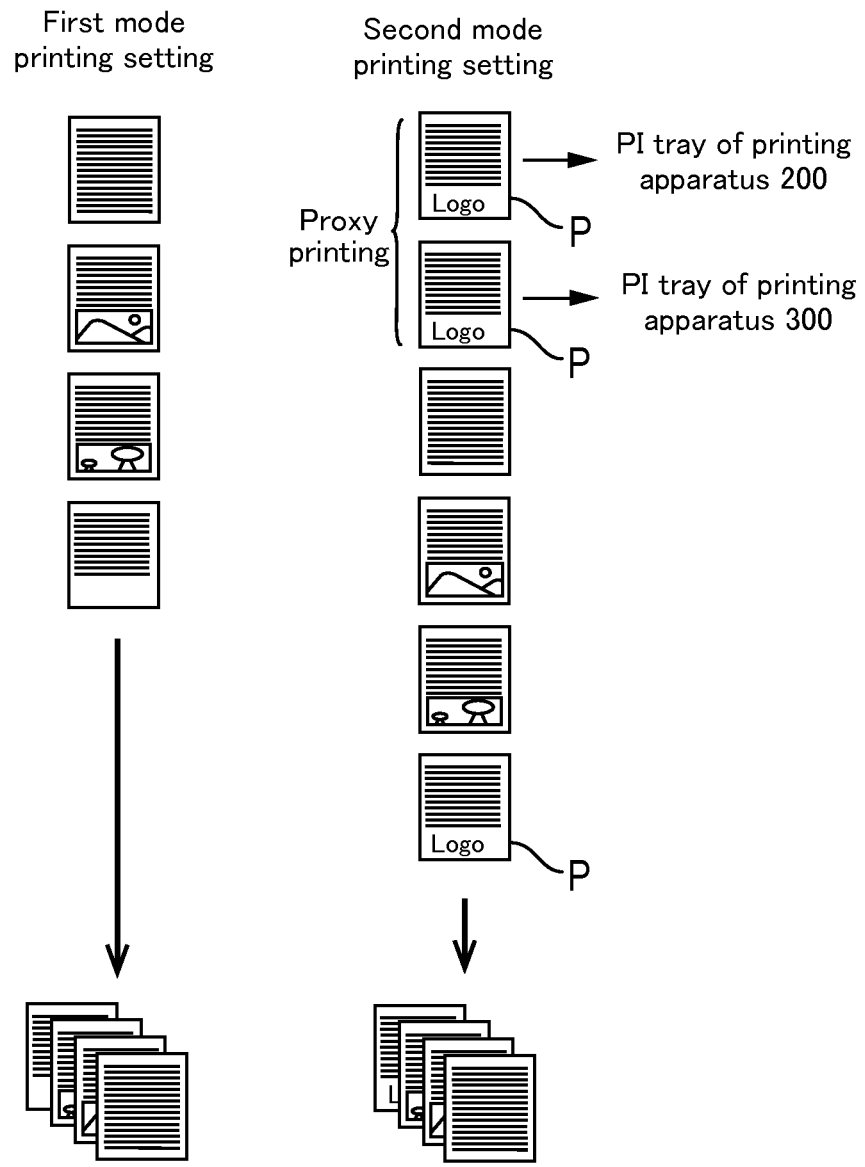
FIG. 12 is a schematic diagram for illustrating the operation of the printing apparatus 100 in the number-of-copies dividing printing step shown in FIG. 10.

FIGS. 11 and 12 are a flowchart and a schematic diagram for illustrating the operation of the printing apparatus 100 in the number-of-copies dividing printing step S09 shown in FIG. 10. An algorithm represented by the flowchart of FIG. 11 is stored as a processing program in the HDD 115 of the printing apparatus 100 and executed by the control unit 111.

The printing job (the number-of-copies dividing printing job) from the server computer 500 is received by the communication interface 117 (step S21), and it is determined whether the printing setting in the printing job is the second mode printing setting or not (step S22).

When the printing setting included in the printing job is determined to be the first mode printing setting and not the second mode printing setting (step S22: NO), the process goes to step S25. When the printing setting included in the printing job is determined to be the second mode printing setting (step S22: YES), the image forming unit 130 executes proxy printing of the high quality page P included in the number of copies assigned to the printing apparatuses 200 and 300 (step S23), then the printed high quality pages P are discharged (step S24), and the process goes on to the step S25.

In the step S25, printing of the number of copies assigned to the printing apparatus 100 is executed and the printed papers are discharged (step S26).

The printing apparatus 100 executes only printing of the number of copies assigned to the printing apparatus 100 when the printing setting included in the printing job is the first mode printing setting, as clearly indicated in FIG. 12, in addition to the above. On the other hand, when the printing setting included in the printing job is the second mode printing setting, the printing apparatus 100 executes proxy printing of the high quality page included in the number of copies assigned to the printing apparatuses 200 and 300 in addition to the printing of the number of copies assigned to the printing apparatus 100.

That is, when the high quality page P is present in the print data, the printing apparatus 100 subjected to color setting using a color sample executes printing for the assigned number of copies without excluding the high quality page P. Thus, it is unnecessary to perform a task for merging the high quality page P to paper printed in the printing apparatus 100, suppressing work efficiency reduction.

Next, operations of the printing apparatuses 200 and 300 in the number-of-copies dividing printing step S09 will be described.

Figure 13:
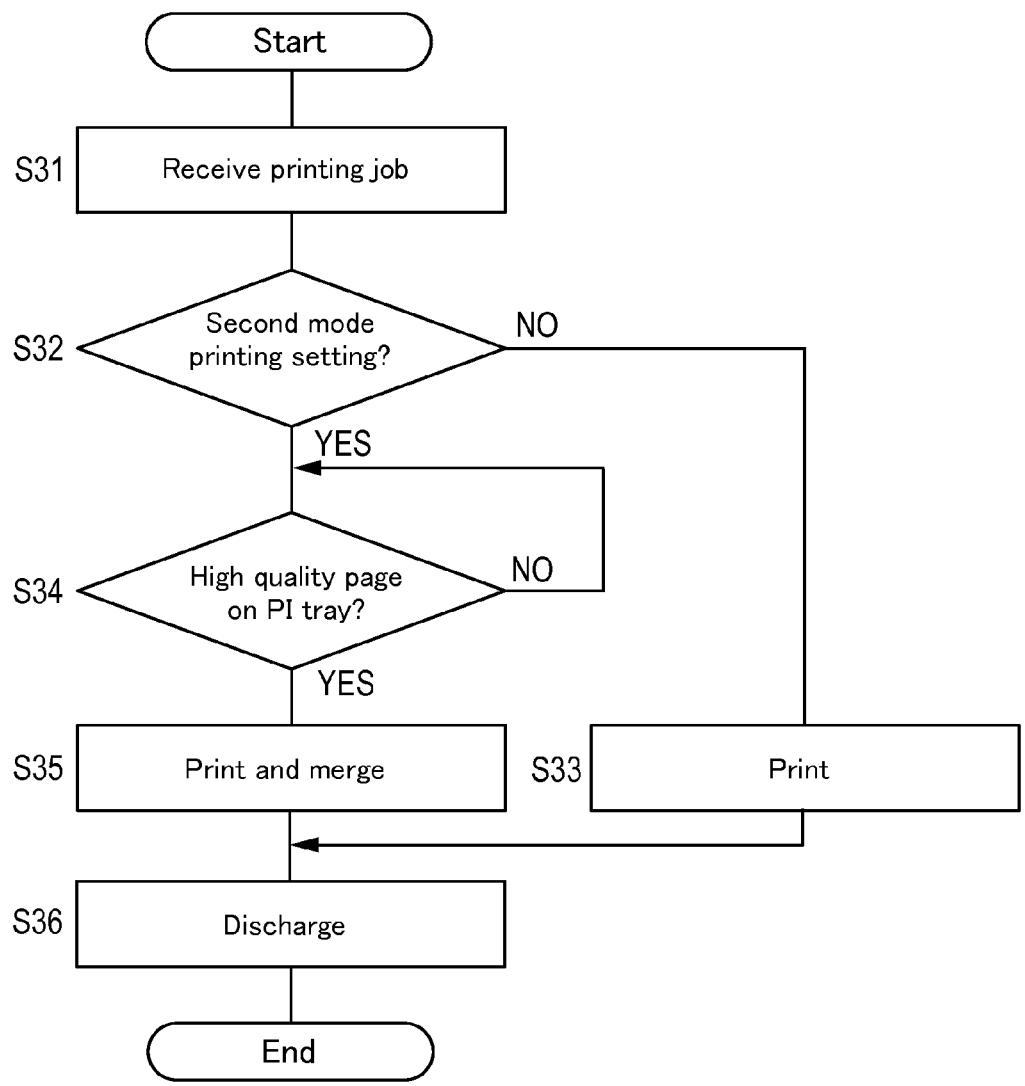
FIG. 13 is a flowchart for illustrating operations of the printing apparatuses 200 and 300 in the number-of-copies dividing printing step shown in FIG. 10.
Figure 14:
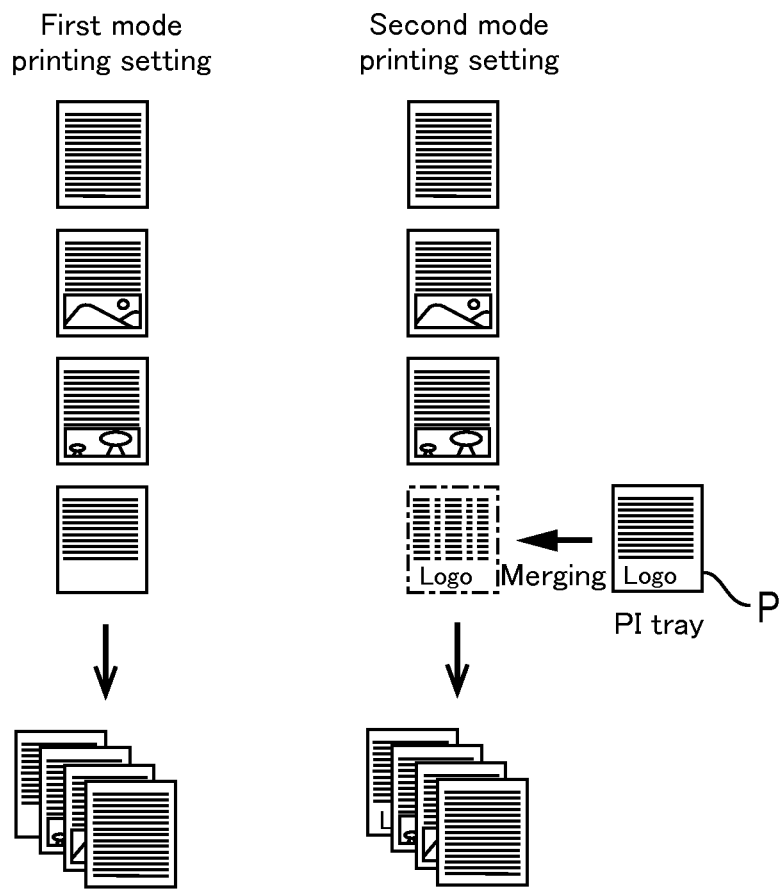
FIG. 14 is a schematic diagram for illustrating the operations of the printing apparatuses 200 and 300 in the number-of-copies dividing printing step shown in FIG. 10.

FIGS. 13 and 14 are a flowchart and a schematic diagram for illustrating the operations of the printing apparatuses 200 and 300 in the number-of-copies dividing printing step S09 shown in FIG. 10. An algorithm represented by the flowchart of FIG. 13 is stored as a processing program in the HDDs 215 and 315 of the printing apparatuses 200 and 300, and executed by the control units 211 and 311.

When a printing job (a number-of-copies dividing printing job) from the server computer 500 is received through the communication interface 217 (317) (step S31), it is determined whether the printing setting included in the printing job is the second mode printing setting or not (step S32).

When the printing setting included in the printing job is determined to be the first mode printing setting and not the second mode printing setting (step S32: NO), printing of the number of copies assigned to the printing apparatus 200 (300) is executed (step S33), and the process goes to step S36.

When the printing setting included in the printing job is determined to be the second mode printing setting (step S32: YES), it is determined whether the high quality page that is included in the number of copies assigned to the printing apparatus 200 (300) and has been proxy printed in the printing apparatus 100 is placed or not on the PI tray 242 (342) of the second paper feeding unit 240 (340) (step S34).

When it is determined that the high quality page is placed on the PI tray 242 (342) of the second paper feeding unit 240 (340) (step S34: YES), the image forming unit 230 (330) executes printing of the assigned number of copies except for the printing of the high quality page, as well as the high quality page is fed from the PI tray 242 (342) to be merged into printed paper in the merging unit 244 (344) (step S35), and the process goes to step S36.

In the step S36, the papers printed in the steps S33 and S35 are discharged.

The printing apparatus 200 (300) execute printing of the number of copies assigned to the printing apparatus 200 (300) as they are, when the printing setting included in the printing job is the first mode printing setting, as clearly indicated in FIG. 14 in addition to the above. When the printing setting included in the printing job is the second mode printing setting, the printing apparatus 200 (300) executes printing of the assigned number of copies except for the printing of the high quality page, and also merge the high quality page proxy printed in the printing apparatus 100 to the printed paper.

In other words, when the high quality page P exists in the print data, the printing apparatus 200 (300) subjected to color setting by adjustment of calibration (that is, which have not been subjected to color setting using a color sample) does not print the high quality page and cause the printing apparatus 100 subjected to color setting using a color sample to execute proxy printing of the high quality page and then merge the high quality page into paper printed in the printing apparatus 200 (300). Accordingly, color variation does not occur in the print output of the object requiring strict color accuracy, ensuring printing quality.

Next, a first modification and a second modification according to the embodiment of the present invention will be sequentially described.

Figure 15:
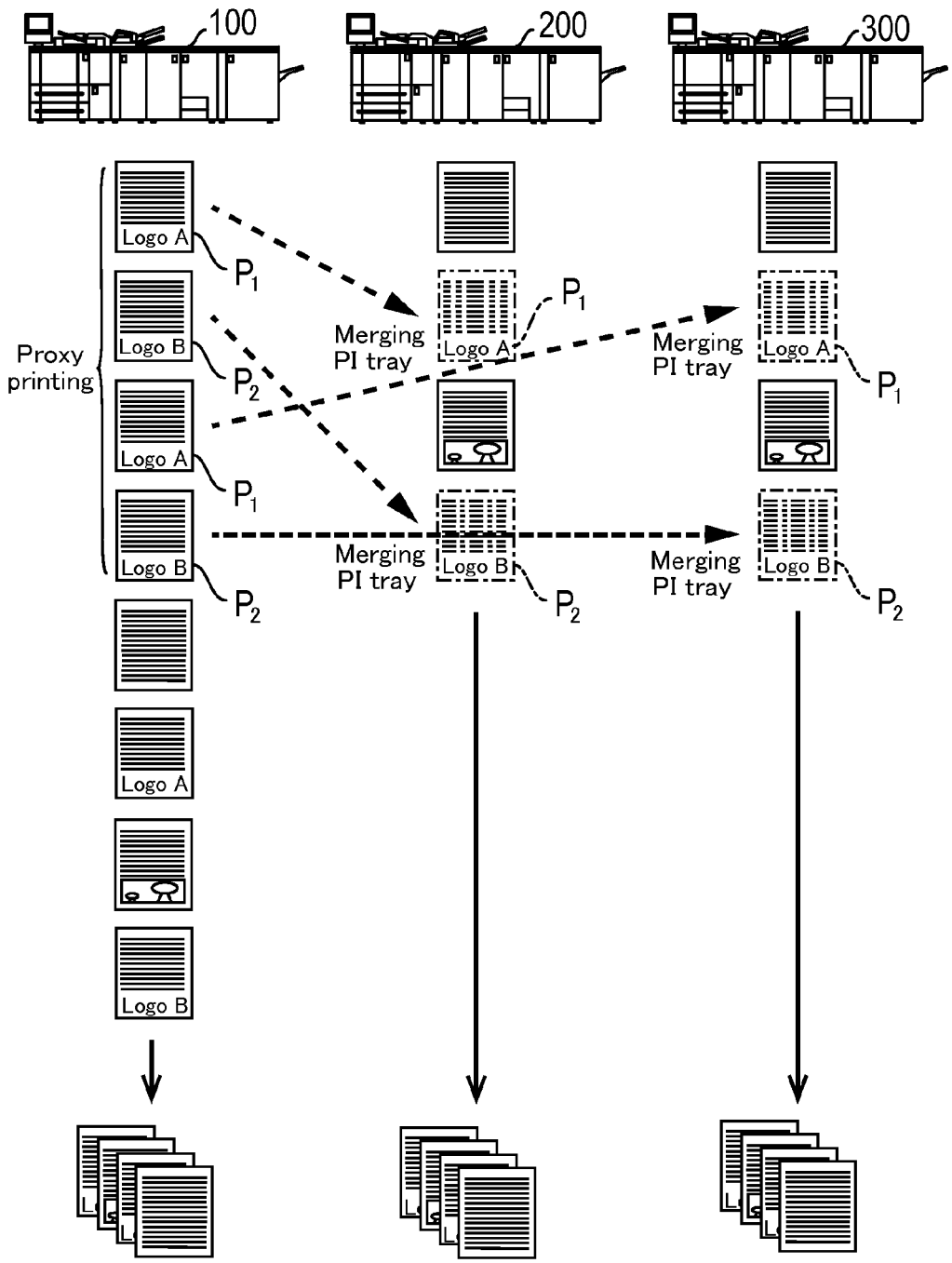
FIG. 15 is a schematic diagram for illustrating a first modification according to the embodiment of the present invention.
Figure 16:
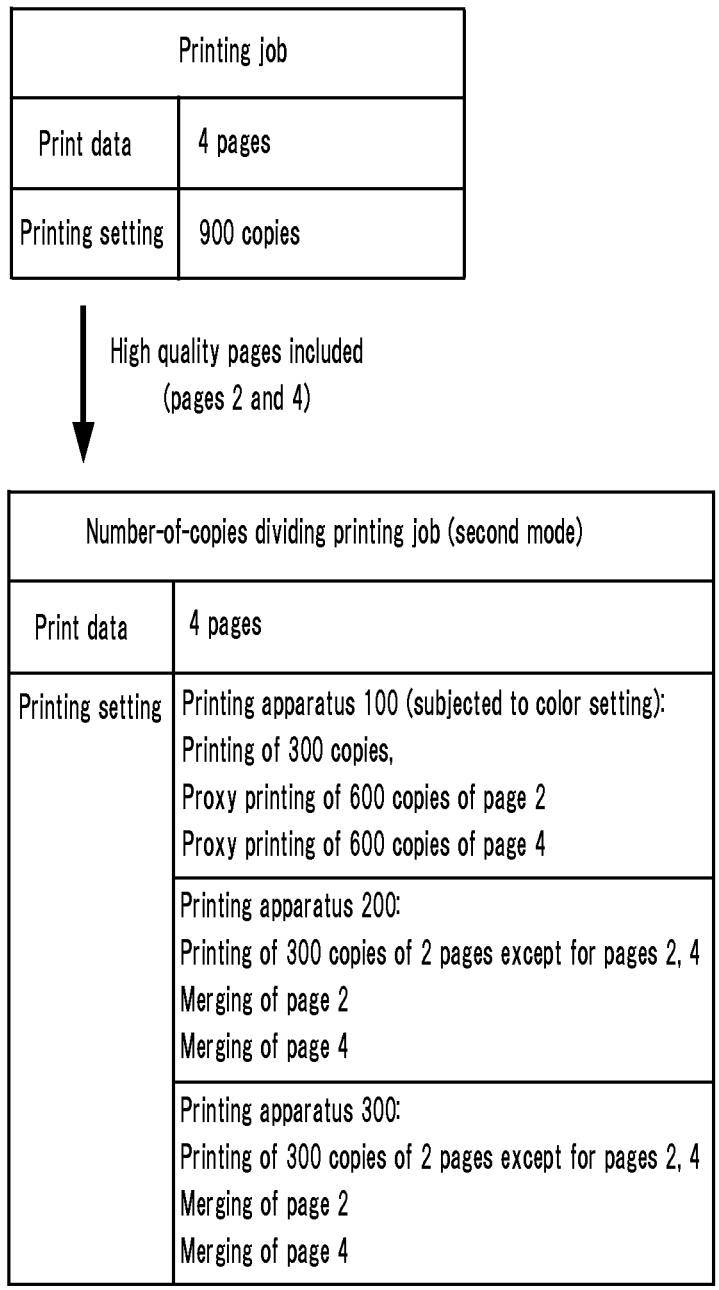
FIG. 16 is a conceptual diagram for illustrating a printing job of the first modification.

FIG. 15 is a schematic diagram for illustrating the first modification according to the embodiment of the invention, and FIG. 16 is a conceptual diagram for illustrating a printing job of the first modification.

A printed matter to which the number-of-copies dividing printing is applied can include a plurality of high quality pages $P_1$ and $P_2$. In this case also, in the second mode, the printing apparatus 100 subjected to color setting using a color sample executes printing of the assigned number of copies and printing of the high quality pages $P_1$ and $P_2$ included in the number of copies assigned to the printing apparatuses 200 and 300 not subjected to color setting using a color sample, as shown in FIG. 15. On the other hand, the printing apparatuses 200 and 300 not subjected to color setting using a color sample execute printing of the assigned number of copies except for the printing of the high quality pages $P_1$ and $P_2$, and also merge, into the printed papers, the high quality pages $P_1$ and $P_2$ proxy printed in the printing apparatus 100 subjected to color setting using a color sample.

For example, as shown in FIG. 16, upon reception of a printing job for printing 900 copies of a printed matter consisting of 4 pages in which pages 2 and 4 are the high quality pages $P_1$ and $P_2$, a printing job (a number-of-copies dividing printing job) transmitted to the printing apparatuses 100, 200, and 300 is set such that the printing apparatus 100 prints assigned 300 copies and proxy prints 600 copies of each of the high quality pages $P_1$ and $P_2$ for the printing apparatuses 200 and 300, whereas each of the printing apparatuses 200 and 300 prints 300 copies of a printed matter consisting of 2 pages except for the pages 2 and 4 and places the high quality pages $P_1$ and $P_2$ proxy printed in the printing apparatus 100 in respective positions after page 1 and page 2 of each printed matter.

The printing apparatus 100 executes the printing of the assigned number of copies as they are without excluding the high quality pages $P_1$ and $P_2$, as described above. Thus, it is unnecessary to perform a task for merging the high quality pages $P_1$ and $P_2$ to the papers printed in the printing apparatus 100, suppressing work efficiency reduction. On the other hand, the high quality pages $P_1$ and $P_2$ included in the number of copies assigned to the printing apparatuses 200 and 300 are proxy printed in the printing apparatus 100 and merged into paper printed in the printing apparatuses 200 and 300, so that color variation does not occur in the print output of the objects requiring strict color accuracy, thereby ensuring printing quality. Accordingly, the first modification of the invention achieves good work efficiency and can ensure printing quality of objects requiring strict color accuracy.

Figure 17:
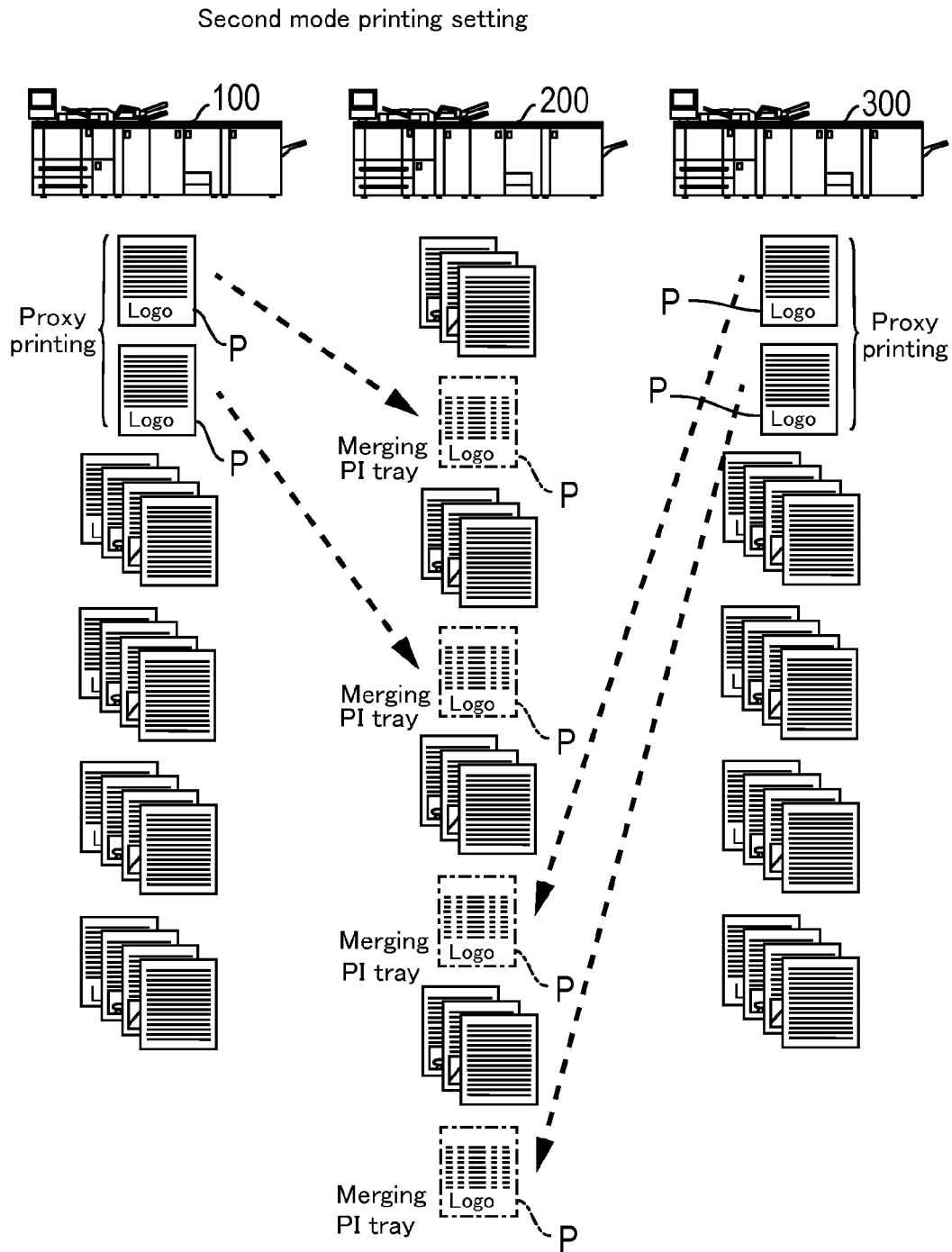
FIG. 17 is a schematic diagram for illustrating a second modification according to the embodiment of the present invention.

FIG. 17 is a schematic diagram for illustrating the second modification according to the embodiment of the invention, and FIG. 18 is a conceptual diagram for illustrating a printing job of the second modification.

It is also possible to use a plurality of printing apparatuses subjected to color setting using a color sample. For example, as shown in FIG. 17, when, in addition to the printing apparatus 100, the printing apparatus 300 is also a printing apparatus subjected to color setting using a color sample, the server computer 500 halves proxy printing of high quality page P included in the number of copies assigned to the printing apparatus 200 into a part assigned to the printing apparatus 100 and a part assigned to the printing apparatus 300.

For example, as shown in FIG. 18, upon reception of a printing job for printing 900 copies of a printed matter consisting of 4 pages in which page 4 is the high quality page P, a printing job (a number-of-copies dividing printing job) transmitted to the printing apparatuses 100, 200, and 300 is set such that the printing apparatuses 100 and 300, respectively, print assigned 300 copies and also proxy print 150 copies of the high quality page P for the printing apparatus 200, whereas the printing apparatus 200 prints 300 copies of the printed matter consisting of 3 pages except for page 4 and also places each of the high quality pages P proxy printed in the printing apparatuses 100 and 300 in a position after page 3 of each of the printed matters.

The proxy printing of the high quality page P is not limited to the form of dividing into equal parts and can be divided on the basis of printing speeds of the printing apparatuses 100 and 300. For example, when the number of copies for the proxy printing of the high quality page P is 10, the printing speed of the printing apparatus 100 is 40 sheets/min, and the printing speed of the printing apparatus 300 is 60 sheets/min, printing of 4 copies is assigned to the printing apparatus 100 and printing of 6 copies is assigned to the printing apparatus 300. Alternatively, the proxy printing can also be divided on the basis of operation statuses of the printing apparatuses 100 and 300. For example, when the number of copies for proxy printing of the high quality page P is 9 and the printing apparatus 100 has a printing job for 3 pages, whereas the printing apparatus 300 does not have any printing job, printing of 3 copies is assigned to the printing apparatus 100 and printing of 6 copies is assigned to the printing apparatus 300.

As described hereinabove, in the present embodiment, the printing apparatus 100 subjected to color setting using a color sample executes printing of the assigned number of copies as they are without excluding any pages that include an object requiring strict color accuracy. It is thus unnecessary to perform a task for merging the pages including the object requiring strict color accuracy into paper printed in the printing apparatus 100, thereby suppressing work efficiency reduction. In addition, the pages including the object requiring strict color accuracy included in the number of copies assigned to the printing apparatuses 200 and 300 not subjected to color setting using a color sample are proxy printed in the printing apparatus 100 subjected to color setting using a color sample and merged into the papers printed in the printing apparatuses 200 and 300. Thus, color variation does not occur in the print output of the object requiring strict color accuracy, thereby ensuring printing quality. Accordingly, the present embodiment has good work efficiency and can ensure printing quality of objects requiring strict color accuracy.

The present invention is not limited to the above-described embodiments and can be modified and changed in various forms within the scope of the claims. For example, as the printing apparatuses, there can be used a multi-functional peripheral (MFP) having functions of copying, printing, and scanning. In addition, the printing setting included in a printing job (a number-of-copies dividing printing job) transmitted to the printing apparatuses 100, 200, and 300 can be limited to only a printing setting associated with each of the printing apparatuses 100, 200, and 300. Furthermore, a printing job requested from a client can be directly input to the server computer 500 (the control apparatus 20) without using the network 30.

The means, the method, and the program according to the present invention can be achieved by an exclusive hardware circuit. In addition, when the present invention is achieved by the program, the program can be provided by a computer-readable recording medium, such as a USB (universal serial bus) memory or a DVD (digital versatile disc)-ROM (read only memory) or can be provided on line via a network such as the Internet, instead of a storage medium. In this case, usually, the program is transmitted to a storage device such as a magnetic disk unit and stored therein. Alternatively, the program can be provided as single application software or provided by being incorporated as a single function into another software.

What is claimed is:

1. A print system comprising:
   a first printing apparatus subjected to color setting using a color sample, and executing printing on a paper;
   a second printing apparatus not subjected to color setting using a color sample, and executing printing on a paper; and
   a control apparatus assigning a printing job that involves a print output of a plurality of copies to said first and said second printing apparatuses to cause said first and said second printing apparatuses to execute a number-of-copies dividing printing, said control apparatus, said first printing apparatus and said second printing apparatus being communicably connected to each other,
   print data included in the printing job containing a page that includes an object needed to be printed by a printing apparatus subjected to color setting using a color sample, wherein
   said control apparatus comprises
   a printing setting generation unit that generates a printing setting for causing said first printing apparatus to execute printing of a number of copies assigned to said first printing apparatus and proxy printing of said page included in a number of copies assigned to said second printing apparatus, causing said second printing apparatus to execute printing of the number of copies assigned to said second printing apparatus except for the printing of said page, and merging the proxy printed page into a paper printed in said second printing apparatus, and
   a communication unit that transmits a number-of-copies dividing printing job including the printing setting and the print data to said first and said second printing apparatuses,
   said first printing apparatus comprises a printing unit that executes the printing of the assigned number of copies and said proxy printing of said page according to the received number-of-copies dividing printing job, and
   said second printing apparatus comprises a printing unit that executes the printing of the assigned number of copies except for the printing of said page, and a merging unit that merges said page proxy printed in said first printing apparatus into the printed paper according to the received number-of-copies dividing printing job.

2. The print system according to claim 1, wherein said control apparatus comprises a client computer and a server computer communicably connected to each other, said server computer including said printing setting generation unit and said communication unit, and said client computer including a communication unit that notifies said first printing apparatus and said second printing apparatus to said server computer.

3. The print system according to claim 1, comprising a plurality of said first printing apparatus, wherein said control apparatus divides said proxy printing of said page to assign to each of said first printing apparatuses.

4. The print system according to claim 3, wherein said proxy printing of said page is equally divided.

5. The print system according to claim 3, wherein said proxy printing of said page is divided on the basis of a printing speed of each of said first printing apparatuses.

6. The print system according to claim 3, wherein said proxy printing of said page is divided on the basis of an operation status of each of said first printing apparatuses.

7. The print system according to claim 1, wherein the color setting of said second printing apparatus is performed by adjustment of calibration.

8. A printing method applied to a print system comprising a first printing apparatus subjected to color setting using a color sample and executing printing on a paper, a second printing apparatus not subjected to color setting using a color sample and executing printing on a paper, and a control apparatus managing printing in said first printing apparatus and said second printing apparatus, said control apparatus, said first printing apparatus and said second printing apparatus being communicably connected to each other, for assigning a printing job that involves a print output of a plurality of copies to said first and said second printing apparatuses to cause said first and said second printing apparatuses to execute a number-of-copies dividing printing, print data included in the printing job containing a page that includes an object needed to be printed by a printing apparatus subjected to color setting using a color sample, the printing method comprising the steps of:

(A) generating, by a printing setting generation unit of said control apparatus, a printing setting for causing said first printing apparatus to execute printing of a number of copies assigned to said first printing apparatus and proxy printing of said page included in a number of copies assigned to said second printing apparatus, causing said second printing apparatus to execute the printing of the number of copies assigned to said second printing apparatus except for the printing of said page, and merging the proxy printed page into a paper printed in said second printing apparatus;

(B) transmitting a number-of-copies dividing printing job that includes the printing setting and the print data to said first and said second printing apparatuses by a communication unit of said control apparatus;

(C) executing the printing of the assigned number of copies and said proxy printing of said page by a printing unit of said first printing apparatus according to the received number-of-copies dividing printing job; and (D) executing the printing of the assigned number of copies except for the printing of said page by a printing unit of said second printing apparatus according to the received number-of-copies dividing printing job, and merging said page proxy printed in said first printing apparatus into the printed paper in a merging unit of said second printing apparatus.

9. The printing method according to claim 8, wherein said print system comprises a plurality of said first printing apparatuses, the printing method further comprising the step of (E) dividing said proxy printing of said page to assign to each of said first printing apparatuses.

10. The printing method according to claim 9, wherein said proxy printing of said page is equally divided.

11. The printing method according to claim 9, wherein said proxy printing of said page is divided on the basis of a printing speed of each of said first printing apparatuses.

12. The printing method according to claim 9, wherein said proxy printing of said page is divided on the basis of an operation status of each of said first printing apparatuses.

13. The printing method according to claim 8, wherein the color setting of said second printing apparatus is performed by adjustment of calibration.

14. A non-transitory computer-readable recording medium stored with a print program for controlling a control apparatus of a print system comprising a first printing apparatus subjected to color setting using a color sample and executing printing on a paper, a second printing apparatus not subjected to color setting using a color sample and executing printing on a paper, and said control apparatus managing printing in said first printing apparatus and said second printing apparatus, said control apparatus, said first printing apparatus and said second printing apparatus being communicably connected to each other, for assigning a printing job that involves a print output of a plurality of copies to said first and said second printing apparatuses to cause said first and said second printing apparatuses to execute a number-of-copies dividing printing, print data included in the printing job containing a page that includes an object needed to be printed by a printing apparatus subjected to color setting using a color sample, said print program causing said control apparatus to execute a process comprising: the procedures of (A) generating, by a printing setting generation unit of said control apparatus, a printing setting for causing said first printing apparatus to execute printing of a number of copies assigned to said first printing apparatus and proxy printing of said page included in a number of copies assigned to said second printing apparatus, causing said second printing apparatus to execute the printing of the number of copies assigned to said second printing apparatus except for the printing of said page, and merging the proxy printed page into a paper printed in said second printing apparatus; and (B) transmitting a number-of-copies dividing printing job that includes the printing setting and the print data to said first and said second printing apparatuses by a communication unit of said control apparatus.

15. The non-transitory computer-readable recording medium according to claim 14, wherein said print system comprises a plurality of said first printing apparatuses, and wherein said process further comprises the procedure of (C) dividing said proxy printing of said page to assign to each of said first printing apparatuses.

16. The non-transitory computer-readable recording medium according to claim 15, wherein said proxy printing of said page is equally divided.

17. The non-transitory computer-readable recording medium stored with print program according to claim 15, wherein said proxy printing of said page is divided on the basis of a printing speed of each of said first printing apparatuses.

18. The non-transitory computer-readable recording medium according to claim 15, wherein said proxy printing of said page is divided on the basis of an operation status of each of said first printing apparatuses.

* * * * *